United States Patent [19]

Oka et al.

[11] Patent Number: 4,959,398
[45] Date of Patent: Sep. 25, 1990

[54] POWDERY ADHESIVE AND PROCESS FOR PREPARATION THEREOF

[75] Inventors: Kōichirō Oka, Ibaraki; Ikuo Hagiwara, Ohtsu, both of Japan

[73] Assignee: Toray Industries, Inc., Tokyo, Japan

[21] Appl. No.: 310,171

[22] Filed: Feb. 13, 1989

[51] Int. Cl.$^5$ ............................................. C08L 63/10
[52] U.S. Cl. ..................... 523/400; 523/407; 523/414; 523/420; 523/466; 528/88; 528/93; 528/111; 528/118; 528/119; 528/124; 428/403; 428/407
[58] Field of Search ............... 523/460, 407, 414, 420, 523/466; 428/403, 407; 528/88, 93, 111, 118, 119, 124

[56] References Cited

U.S. PATENT DOCUMENTS

| | | | |
|---|---|---|---|
| 4,435,543 | 3/1984 | Ema et al. | 525/143 |
| 4,588,617 | 5/1986 | /// | 427/443.1 |
| 4,732,961 | 3/1988 | /// | 528/87 |
| 4,752,528 | 6/1988 | /// | 428/403 |

FOREIGN PATENT DOCUMENTS 216632  4/1987  European Pat. Off. .

*Primary Examiner*—John Kight, III
*Assistant Examiner*—Sam A. Acquah
*Attorney, Agent, or Firm*—Armstrong, Nikaido, Marmelstein, Kubovcik & Murray

[57] ABSTRACT

A powdery adhesive comprised of spherical particles comprising 40 to 90 parts by weight of an epoxy resin component, 10 to 60 parts by weight of a rubber component and a latent curing agent contained inside the particles, the average particle size of the particles being from 0.1 to 500 μm. The powdery adhesive may be prepared by a process comprising a step of preparing a compatible mixture comprising an epoxy resin component, a rubber component and a common organic solvent, a step of emulsifying or suspending the compatible mixture in an aqueous medium to form spherical particles, and a step of causing a phase separation of the epoxy resin component and the rubber component in the spherical particles.

23 Claims, No Drawings

POWDERY ADHESIVE AND PROCESS FOR PREPARATION THEREOF

BACKGROUND OF THE INVENTION (1) Field of the Invention

The present invention relates to a powdery adhesive and a process for the preparation thereof. The powdery adhesive of the present invention is preferably used as a spot adhesive for bonding two substrates of an electro-optical element comprising a liquid crystal, such as a smectic liquid crystal or a nematic liquid crystal, which is supported between the substrates, especially two substrates having a uniform spacing of an order of $\mu m$.

(2) Description of the Related Art

A liquid crystal electro-optical element comprises two substrates confronting each other with a certain spacing therebetween and a liquid crystal sealed in the spacing, in which each substrate comprises a driving transparent electrode film and an orienting film for orienting liquid crystal molecules, which are formed on the surface of a glass sheet.

A liquid crystal electro-optical element comprising a ferroelectric liquid crystal showing the chiral smectic C phase was recently developed (see, for example, Japanese Unexamined Patent Publication No. 56-107216). A liquid crystal substance having the chiral smectic C phase, such as p-decyloxybenzylidene-p'-amino-2-methylbutyl cinnamate or p-hexyloxyben-zylidene-p'-amino-2-chloropropyl cinnamate, has a structure in which liquid crystal molecules are spirally oriented. If the liquid crystal is injected between two substrates arranged to confront each other with a spacing narrower than the frequency of this spiral, the liquid crystal molecules lose the spiral structure, and simultaneously, a bistable state characteristic is produced by the influence of the orienting film. Two stable states are alternated at a high speed in response to an applied voltage by utilizing the ferroelectric property possessed by the liquid crystal molecules, whereby the liquid crystal is driven. If the voltage is removed, the liquid crystal molecules maintain one of the two stable states, and therefore, the liquid crystal has a memory property.

However, since the liquid crystal has the chiral smectic C phase, to realize the bistable state in the liquid crystal substance, two substrates must be arranged with a certain spacing smaller than several $\mu m$, but since distortions and warping are present in the substrates, it is difficult to uniformly decrease the spacing between the substrates.

Under this background, it is desirable to provide a technique of forming a cell structure in which two substrates are arranged in parallel with as narrow a spacing as possible therebetween.

It is also desirable to provide a technique of producing a stability against shock or movements of the liquid crystal in a liquid crystal electro-optical element.

A liquid electro-optical element is sometimes exposed to a low temperature during transportation or use, and the liquid crystal electro-optical element generally must have be stable at about $-30°$ C. and drivable at about $-20°$ C. Among the members constituting the liquid crystal electro-optical element, the glass, spacer particles or adhesive particles have a linear expansion coefficient on an order of $10^{-5}/°C.$, but the linear expansion coefficient of the liquid crystal is on an order of $10^{-3}/°C.$ Accordingly, as the element is cooled from a temperature close to room temperature to a lower temperature, the liquid crystal is unilaterally shrunk. Accordingly, by a simple calculation, it will be readily understood that, if the temperature is lowered by about $50°$ C. from room temperature to $-30°$ C., in about 15% of the display area, the state in which the liquid crystal is not filled, i.e., the state wherein vacuum bubbles occur, is formed, and a blank portion is formed in the display picture. Practically, because of distortions of the substrates and the deformation of spacer particles and adhesive particles, the quantity of vacuum bubbles is smaller than the calculated quantity, but it is apparent that vacuum bubbles are formed, and thus the quality of the liquid crystal electro-optical element is drastically degraded at low temperatures.

SUMMARY OF THE INVENTION

The present invention solves the foregoing problems, and an object of the present invention is to provide a fine spherical powdery adhesive.

More particularly, the present invention provides a powdery adhesive which is preferably used for the production of a liquid crystal element in which vacuum bubbles are not formed. Furthermore, the present invention provides a powdery adhesive having a high peel strength to a film, and is preferably used for the production of a film-based liquid crystal display element.

In accordance with the present invention, the above-mentioned object is attained by a powdery adhesive comprising substantially spherical particles comprising 40 to 90 parts by weight of an epoxy resin component and 10 to 60 parts by weight of a rubber component, and a latent curing agent contained inside the particles, the average particle size of the particles being from 0.1 to 500 $\mu m$.

DESCRIPTION OF THE PREFERRED EMBODIMENTS

An epoxy resin having at least 2 epoxy groups in the molecule is preferably used as the epoxy resin in the present invention.

As the epoxy resin having two epoxy groups, there can be mentioned bisphenol type resins such as bisphenols A, B, F, S and H, especially adducts in which the addition number n is 0 to about 30, dimer acid-modified bisphenols, neopentyl glycol diglycidyl ether, 1,6-hexane-diol diglycidyl ether, and alicyclic epoxy resins. As the epoxy resins having at least 3 epoxy groups, there can be mentioned polyglycidyl ethers of phenol novolak type compounds and N,N,N',N'-tetra-glycidyl-m-xylene-diamine.

In view of the compatibility with a latent curing agent described hereinafter, an epoxy resin having two epoxy groups, especially a bisphenol type resin, is preferably used, and in many cases, an epoxy resin having at least three epoxy groups or a monofunctional epoxy compound such as 2-ethylhexylglycidyl ether is used as a subsidiary component to be incorporated in the above-mentioned bifunctional epoxy compound. If a liquid or sticky epoxy resin is used, spherical particles composed of a mixture of the epoxy resin with a rubber component and a latent curing agent must be solidified by partial curing of the epoxy resin (conversion to the B stage), and in this case, to prevent crosslinking in the B stage, preferably a trifunctional or more highly functional epoxy compound is used only partially. If the amount used of a monofunctional epoxy compound is increased, the degree of polymerization after curing tends to decrease.

An organic solvent-soluble rubber component is preferably used in the present invention, since a rubber component generally has a high viscosity and it is difficult to mix the rubber component with an epoxy resin, and thus the viscosity is reduced by the action of an organic solvent to improve the blendability or processability.

Examples of the rubber component that can be used in the present invention will now be described, although the rubber components that can be used are not limited to those mentioned below.

More specifically, there can be mentioned rubbers comprising butadiene at least as one copolymerization component, such as a butadiene/acrylonitrile copolymer and this copolymer having terminals modified with a carboxyl group or an amino group, rubbers composed substantially solely of butadiene, such as polybutadiene and modification products thereof, e.g., maleated, methacrylated, acrylated and epoxidized polybutadienes, hydroxyl-terminated liquid polybutadiene and modification products thereof, such as terminal or intramolecular maleation, methcrylation, acrylation, glycidylation and isocyanation products, and acrylic rubbers comprising an acrylic or methacrylic acid ester of an aliphatic alcohol having a relatively large carbon number, such as butyl acrylate, as a copolymerization component. Furthermore, there can be mentioned rubber-modified epoxy resin having all or some of terminal epoxy groups modified with a rubber component such as NBR. The rubber component is incorporated in the form of a polymer or monomer. Where a monomer is incorporated, the monomer is polymerized to a rubber component after the incorporation.

In connection with the bonding force, good results are obtained when the epoxy resin component is incorporated in an amount of 40 to 90 parts by weight, especially 50 to 80 parts by weight, and the rubber component is incorporated in an amount of 10 to 60 parts by weight, especially 20 to 50 parts by weight. If the amount of the epoxy resin component is smaller than 40 parts by weight, the rubber component forms a continuous layer and generally the particles are too soft and the bonding force is reduced. If the amount of the epoxy resin component exceeds 90 parts by weight, the modification effect by the rubber component is unsatisfactory.

Among the above-mentioned rubber components, a rubber component having an epoxy group or a glycidyl group is preferred, because the rubber component shows the same curing behavior as that of the epoxy resin component at the curing step. Moreover, a rubber component having a reactive group capable of reacting with the epoxy resin component is preferably used.

The epoxy resin and rubber components may be compatible with each other, or a phase separation may occur when mixed. However, where a phase-separated mixture of the epoxy resin and rubber components are granulated to spherical particles by a method described hereinafter, sometimes an islands-in-sea structure is formed in the product according to the degree (state) of stirring, and the reproducibility is degraded. Accordingly, even in a mixture in which phase separation occurs, in view of the homogeneously of the composition among particles, preferably both the components are in the compatible state at least before the granulation.

The epoxy resin and the rubber component form a transparent compatible mixture, preferably by heating or using a common organic solvent for both components. If a compatible mixture cannot be formed, the phase separation occurs in the epoxy resin and the rubber component to form an island-in-sea structure. As on method for obtaining the particles of the present invention, there can be mentioned a method in which spherical particles are prepared by an emulsion process described below. According to this method (emulsion process), it is obvious that particles having different compositions according to the size of oil drops are formed. Namely, very small oil drops are composed solely of the epoxy resin or the rubber component, and as the size of the oil drops increases, the dispersion of the composition among particles decreases. In general, it is a common knowledge that, in an emulsion, oil drops have a particle size distribution, and therefore, a powder having a dispersion in the composition is obtained. In view of the foregoing, as the means for obtaining particles having no dispersion in the composition, there is preferably adopted a method in which the epoxy resin and the rubber component are rendered temporarily compatible with each other. An example of this method will now be described.

Where at least one of the epoxy resin and the rubber component is liquid and become compatible with each other very easily, they are often rendered compatible with each other only by mixing. However, if these components are not compatible with each other at a temperature close to room temperature but are rendered compatible by heating, the mixture is heated at a temperature higher than the temperature at which both the components are compatible. However, since the process in which a compatible mixture of the epoxy resin and the rubber component is emulsified as described below is mentioned as one process embodying the present invention, the heating temperature for rendering both components compatible with each other is preferably lower than the boiling point of water, that is 100° C., and can be much higher under compression.

Where the epoxy resin and the rubber component are not rendered compatible only by heating, there can be adopted a method in which the epoxy resin and the rubber component are dissolved in a common solvent for both components. In this case, a solvent emulsifiable in water and easily removable from the emulsification is preferably used. Accordingly, an organic solvent having a boiling point lower than 100° C. and a water insolubility is preferred. If the boiling point is higher than 100° C., since the solvent-removing operation temperature becomes close to the boiling point of water, the amount of entrained water increases and the efficiency of the solvent-removing operation decreases. Furthermore, if the water solubility of the organic solvent increases, emulsification in water becomes difficult. As examples of the organic solvent that can be used, there can be mentioned chloroform, methylene chloride, carbon tetrachloride, ethyl ether, ethyl acetate and benzene. Even if a water-soluble organic solvent such as methanol, ethanol, acetone, dimethylformamide or tetrahydrofuran is contained in an amount of up to about 50% by weight in the above-mentioned organic solvent, the present invention can be embodied.

The compatibility between the epoxy resin and the rubber component is manifested more easily when the molecular weights of both the components are low. However, when the molecular weight of the epoxy resin is low, it is sometimes difficult to recover the product (spherical particles) in the form of a solid, and conversion to the B stage becomes necessary, as described hereinafter.

The powdery adhesive of the present invention should have a property such that the adhesive can be cured at the bonding step. For this purpose, a latent curing agent for the epoxy resin must be present in the interior of the particles. As examples of the latent curing agent, there can be mentioned dicyandiamide, imidazoles, bisphenols, condensates and derivatives thereof, phenol novolaks, polyvinylphenols, carboxylic acids, acid anhydrides, acidic polyesters, carboxyl group-containing polymers such as a styrene/maleic acid copolymer, polyamines and modified polyamines. Among these, bisphenols and condensates thereof have an especially excellent compatibility with the epoxy resin.

The bisphenol derivative is a reaction product of a diglycidyl ether of a bisphenol with a diamine or a dicarboxylic acid having a reactivity with the epoxy group at both the terminals, and dihydrazides derived from a diglycidyl ether of a bisphenol.

As the acid anhydride, there can be mentioned phthalic anhydride compounds such as methyltetrahydrophthalic anhydride, a succinic anhydride compound, maleated terpinene, a styrene monomer/maleic anhydride oligomer, and trialkyltetrahydrophthalic anhydride/maleic anhydride adduct.

As the amine type compound, there can be mentioned aromatic amines such as diaminodiphenylmethane and diaminodiphenylsulfone, and sterically hindered amines such as 2,5-dimethyl-2,5-hexane-diamine and 1,8-diamino-p-methane.

The amount of the latent curing agent is usually 0.05 to 1 equivalent per equivalent of the epoxy groups of the epoxy resin.

If the latent curing agent is of the phenol type or acid anhydride type, since a small amount of a tertiary amine acts as the curing catalyst, the amount used of the tertiary amine is important for changing the curing behavior. However, since usual tertiary amine used for this purpose has a relatively low molecular weight, bleeding of the tertiary amine from the particles sometimes occurs during or after curing. In view of the catalytic activity, in the present invention, use of a compatible high-molecular-weight tertiary amine, such as a condensed oligomer between a diglycidyl ether of a bisphenol and piperazine is recommended.

The process for obtaining substantially spherical powdery adhesive of the present invention will now be described.

Where the mixture of the epoxy resin, the rubber component and a latent curing agent is a non-viscous solid at a temperature close to room temperature, a method can be adopted in which mechanically pulverized particles are rendered spherical by floating in a heating cylinder or dropping therein under force of gravity (hereinafter referred to as the first method).

As another method, there can be mentioned a method in which spherical particles are formed by suspending or emulsifying a compatible mixture of the epoxy resin and the rubber component in a liquid medium composed mainly of water or a water-insoluble liquid (hereinafter referred to as the second method).

Of the above-mentioned first and second methods, the second method is especially preferred in view of the homogeneity and sphericality of the particles, though the method is not limited to the second method. In view of the productivity, preferably the compatible mixture of the epoxy resin and the rubber component is emulsified or suspended in an aqueous liquid by using a surface active agent or the like.

There are many modes of the second method of suspending the mixture of the epoxy resin and the rubber component in a liquid and typical examples thereof will now be described, though the present invention is not limited by these examples.

(1) A method in which the mixture or a solution thereof is continuously extruded into air or a liquid from a vibrating nozzle to cut the mixture or solution in liquid drops, which are collected in the liquid.

(2) A method in which the mixture or a solution thereof is extruded pulsatively from a nozzle arranged in air or liquid and is collected in the liquid.

(3) A method in which the mixture or a solution thereof is emulsified by using a surface active agent.

(4) A method in which the mixture or a solution thereof is emulsified by using a powdery emulsifier.

(5) A method in which the mixture or a solution thereof is emulsified by a protecting colloidal substance.

In view of the productivity, the methods (3), (4) and (5) are preferably adopted, but in the present invention, preferably two or more of the foregoing methods (1) through (5) are adopted in combination.

As the suspension medium to be used in the above-mentioned spherical particle-forming method, there can be mentioned water, polyethylene glycol, wax, liquid paraffin, kerosene, castor oil, olive oil, glyceron and silicone oil. An aqueous medium is preferred in view of the ease of embodying the present invention, the handling ease, the separability from the solvent used, and for economical reasons.

As the surface active agent to be used in the above-mentioned method, there can be mentioned ether type non-ionic surface actives agents such as polyoxyethylene/phenolsubstituted ethers and polyoxyethylene/polyoxypropylene block copolymer polyethers, ester type non-ionic surface active agents such as higher fatty acid-polyethylene glycol esters and fatty acid-polyhydric alcohol esters, and non-ionic agents such as alkoxylated rosins, though surface active agents that can be used are not limited to those mentioned above. The surface active agent is added in an amount of about 2 to about 30% by weight to the mixture of the epoxy resin, the rubber component and the latent curing agent or a solution thereof. As the powdery emulsifier, there can be mentioned fine powdery crystalline cellulose and barium sulfate powder, and the powdery emulsifier is used in an amount of about 2 to 20% by weight. As the protective colloidal substance, there can be mentioned polyvinyl alcohol, gum arabic, carboxymethyl cellulose, gelatin and sodium alginate, and in general, the protective colloidal substance is used while it is dissolved in an aqueous medium in an amount of about 0.5 to about 20% by weight.

Typical instances of the method of emulsifying the mixture of the epoxy resin, the rubber component and the latent curing agent or a solution thereof will now be described.

The surface active agent or powdery emulsifier is generally added to the mixture of the epoxy resin, the rubber component, and the latent curing agent or a solution thereof. Where the protective colloidal substance is used, the protective colloidal substance is generally dissolved in an aqueous medium.

As the means for emulsifying and dispersing the above-mentioned mixture or a solution thereof in an aqueous medium, there can be mentioned a method in which an aqueous liquid is gradually added to the mixture or solution while strongly stirred and a method in which the mixture or solution is gradually added to an aqueous medium while strongly stirred. Where the viscosity of the mixture or solution is low, emulsification is possible by either of the above-mentioned two methods. However, if the viscosity is high, the former method in which an aqueous medium is gradually added to the mixture or solution while strongly stirred is recommended.

Since the epoxy resin generally has a viscosity higher than 1 P, the former method is preferred. More specifically, according to this method, the mixture or solution is charged in a vessel equipped with stirring vanes having a high stirring efficiency, such as plate vanes. If a compatible state is not produced at this step, the temperature is elevated to a level at which the mixture is rendered compatible. Then, an aqueous liquid is added to the mixture or solution while stirring at several hundred rpm or more. The aqueous liquid can be continuously supplied or can be added in a divided manner stepwise. However, it is important that a water-in-oil type (W/O) emulsion is first formed, and then an aqueous liquid added to effect the phase conversion to an oil-in-water type (O/W) emulsion, that is, an ordinary emulsion. When a large quantity of an aqueous liquid is first added in a short time to form an O/W emulsion directly, good results are seldom obtained. The amount of the aqueous liquid necessary for effect emulsification according to the above-mentioned method is about 20 to about 150% by volume based on the mixture or solution of the epoxy resin, the rubber component and the latent curing agent. If the aqueous liquid is used in a larger amount, the aqueous liquid tends to act as a diluent rather than for the emulsification. To form the O/W emulsion appropriately, it is preferable to adopt a method in which the above-mentioned necessary amount of the aqueous liquid is divided into 3 to 10 equal portions and these portions are added at intervals of about 30 seconds to about 30 minutes, or a method in which the aqueous liquid is continuously added at a speed such that all of the aqueous liquid is added over a period of about 1 minute to about 5 hours.

Where the viscosity of the mixture of the epoxy resin, the rubber component, and the latent curing agent is high, by heating, the viscosity is lowered and the mixture is finely dispersed (emulsified) in the suspension medium. Furthermore, a method can be adopted in which the mixture is dissolved in a common solvent, and the solvent is then removed by heating after emulsified.

The above-mentioned solvent to be used for rendering the epoxy resin and the rubber component compatible with each other can be used as the common solvent for lowering the viscosity.

Where the powdery adhesive of the present invention is used as a spot adhesive for a liquid crystal electro-optical element, the epoxy resin and the rubber component are preferably present in a phase-separated islands-in-sea structure. The phase-separated islands-in-sea structure of the particles can be generally observed by an optical microscope.

In one case, the phase separation occurs between the epoxy resin component and the rubber component, and in the other case, the mixture of the epoxy resin component and the rubber component has a homogeneous structure. In each case, the mixture shows peculiar characteristics. In the phase-separated structure, even if the mixture of the epoxy resin and the rubber component or a solution thereof is in the compatible state, with a lowering of the temperature of during the solvent-removing operation, the phase separation occurs, or the phase separation occurs simultaneously with the conversion to the B stage. The hardness of the epoxy resin and the elasticity of the rubber component are generally manifested, although the degree differs according to the kind of the component forming the continuous phase or to the size of the separated phase component, and therefore, the phase-separated structure is especially preferred. In the homogeneous structure, the mixture tends to have weighted mean values of the properties of the epoxy resin and the rubber component, and the homogeneous structure often appears when the epoxy resin is chemically modified with the rubber component.

The reason why the phase-separated structure is especially preferred has not been elucidated, but it is considered that functions are appropriately allotted to the two components so that the epoxy resin exerts a high bonding property and a high glass transition point (Tg) and the rubber component exerts a good pliability at a low temperature. If the epoxy resin component and the rubber component form a compatible mixture, an intermediate value between the two components is generally obtained in each of the properties, and it is considered that an attainment of antinomic properties, for example, a high Tg and a high pliability at a low temperature, cannot be realized for the particles.

Typical methods of forming the phase-separated state will now be described. The phase separation can occur during or after the emulsification, as described below.

(1) The temperature is lowered below the phase separation temperature during or after the emulsification.

(2) After the emulsification, the above-mentioned common solvent, that is, a low water-soluble or water-insoluble organic solvent, is removed. Various methods can be adopted for this purpose, but most popularly, a method is adopted in which the mixture is heated at a temperature close to or higher than the boiling point of the organic solvent under an atmospheric or reduced pressure with a gentle stirring.

According to this method, however, particles are easily bonded to one another during the removal of the organic solvent by heating, and as a result, giant particles are formed or the emulsion is destroyed. In this case, a method is effectively adopted in which a protective colloidal water-soluble organic polymer such as polyvinyl alcohol, gum arabic or carboxymethyl cellulose is dissolved in an amount of about 0.5 to about 20% by weight in the aqueous liquid.

In the above-mentioned second method, when the mixture of the epoxy resin, the rubber component and the latent curing agent is liquid at room temperature, the mixture must be kept in the state of solid spherical particles (B stage) at least at room temperature by partial curing.

Where the mixture of the epoxy resin, the rubber component and the latent curing agent is liquid or sticky at room temperature, the epoxy resin is rendered non-sticky at room temperature by partial curing (conversion to the B stage) of the epoxy resin. For this purpose, a curing agent other than the latent curing agent can be used. Typical instances of the curing agent and curing method will now be described.

(1) A method in which the mixture of the epoxy resin in which a curing agent has been incorporated in advance, the rubber component and the latent curing agent is suspended or emulsified in a liquid composed mainly of water, and partial curing is effected in this state.

(2) A method in which a water-soluble amine type curing agent is added to an emulsion or suspension of the mixture of the epoxy resin, the rubber component and the latent curing agent in a liquid composed mainly of water, to effect partial curing.

In the foregoing methods, to effect curing while preventing a bonding of particles in the suspended state, curing at room temperature is preferred, and good results are often obtained when a room temperature type curing, especially a room temperature type amine curing agent described below, is used.

An amine compound having a property such that when the amine is mixed in a stoichiometrically calculated equivalent amount with the epoxy resin and the mixture is allowed to stand at 20° C. for 8 hours, the mixture has a Shore hardness A of at least 50, is preferably used as the amine type curing agent.

If the Shore hardness A is lower than 50, a good particulate cured product is difficult to obtain.

As the curing agent (not the latent curing agent) to be used in the present invention, there can be mentioned piperazine, hydrazine, ethylene diamine, polyethylene-polyamines such as diethylene-triamine and triethylene-tetramine, alcohol-amines such as monoethanol-amine, and N-(2-aminoethyl)piperazine, although the curing agents that can be used in the present invention are not limited to those exemplified above.

The amount used of the curing agent is changed according to the average particle size of the intended particles and the concentration of the emulsion or suspension, but if the amount of the curing agent is too small, the solid state at room temperature is not attained, and if the amount of the curing agent is too large, the melting point (softening point) becomes high and the bonding force is often lose. It is generally preferred that the curing agent is used in an amount of about 0.1 to about 0.6 equivalent based on the epoxy resin. Where the curing agent is added to the emulsion or suspension, the curing reaction becomes heterogeneous, and thus the reaction efficiency is low. Accordingly, even if the curing agent is used in amount of 1 equivalent or more, good results are often obtained.

To prevent bonding and integration of the particles, preferably the curing reaction is effected while standing or slow-stirring.

By effecting the conversion to the B stage in the above-mentioned manner, the amino group is introduced into the interior of the particles. Namely, the amino group reacts with the epoxy group to be contained in the polymer chain as a secondary or tertiary amine. The amine of such a construction has a function as a latent curing agent. Therefore, the particles converted to the B stage by the use of the curing agent become to have a latent curing agent contained therein at the stage where converted to the B stage even if a latent curing agent is not used from beginning. In such a case, according to the present invention, a powdery adhesive can be obtained by emulsifying or suspending a mixture of the epoxy resin component and the rubber component or a solution thereof to form spherical particles.

It is known that, in some latent curing agents, the curing reaction can be promoted by an amino group, especially a tertiary amino group. Accordingly, where a phenol type latent curing agent is used, the above-mentioned conversion to the B stage is recommended as the means for attaining low-temperature curing. Note, where the organic solvent is removed by heating after the emulsification as pointed out hereinafter, if the above-mentioned amine type curing agent is present, the curing agent by the phenol type latent curing agent is activated and curing may occur during the solvent-removing operation. Accordingly, the amine type curing agent is sometimes added at a temperature close to room temperature after the removal of the organic solvent.

The conversion to the B stage by the amine type curing agent inevitably results in an increase of the polymerization degree of the epoxy resin. Accordingly, during this step, the compatibility between the epoxy resin and the rubber component is often reduced and the phase separation occurs. Namely, the conversion to the B stage by the room temperature type amine curing agent is the third method for causing the phase separation in the interior of the particles.

The powdery adhesive of the present invention may further comprise other additives. An organic or inorganic pigment or dye used for coloration can be mentioned as a typical instance. Usually, this additive is added before the mixture is suspended or emulsified. Furthermore, ultrafine particles of a silica sol or alumina sol having a particle size smaller than 0.5 $\mu$m are mixed or adsorbed to prevent blocking of the particles or attain an antistatic effect.

The suspension after the solidification is subjected to filtration or the like to separate the particles from the suspension medium, and the particles are washed and air-dried or dried at a low temperature, whereby a dry powder can be recovered without reduction of the bonding force.

The particles of the present invention are substantially spherical, and preferably the particle size is 0.1 to 500 $\mu$m, especially 0.5 to 200 $\mu$m. It is very difficult to prepare particles having a particle size smaller than 0.1 $\mu$m, and if the particle size is too small, the function of the particles as the adhesive is degraded. If the particle size exceeds 500 $\mu$m, the particle size is too large for either a powdery coating or a powdery adhesive, and the use of such large particles is not practically preferred.

In general, the particle size of the so-obtained spherical particles is not uniform. Where the particles are used for fabrication of a liquid crystal element, preferably the average particles size of the powdery adhesive is 1 to 100 $\mu$m, especially 1.5 to 60 $\mu$m. The lower limit value in the above-mentioned range is naturally determined by the attainable lower limit value of the spacing between the two substrates of the liquid crystal element, and the upper limit value of the average particle size has a relation to the lower limit value of the particle size at which the presence of the particles can be substantially recognized by the naked eye during actual use, and if the average particle size exceeds the upper limit value, the quality of the liquid crystal element is drastically degraded.

Furthermore, if the powdery adhesive is used for fabrication of a liquid crystal element, preferably the variation of the particle size is within 30%, especially within 20%. Fine particles do not cover the spacing between the two substrates but are bonded only to one substrate, and therefore, these fine particles make no contribution to the bonding force. Large particles are seen to be striking, and degrade the quality of the liquid crystal element Therefore, it is generally preferred that the particle size distribution is as sharp as possible.

Note, the variation of the particle size is the value obtained by dividing the standard deviation ($\delta$) of the particle size distribution by the average particle size, and multiplying the obtained value by 100.

Fine particles tend to agglomerate and form seemingly larger particles, and in the case of particles prepared by the wet method, agglomeration often occurs during the drying step and this is disadvantageous when the powdery adhesive is used. Of the above-mentioned methods for obtaining spherical particles, the methods (3), (4) and (5) give particles having a broad primary particle size distribution, even if agglomeration does not occur.

Accordingly, to obtain a powder having the above-mentioned specific average particle size and particle size distribution, generally the prepared particles must be classified As typical instance of the classification method, the following methods can be mentioned although the methods that can be adopted are not limited to those described below.

(1) Elutriation Method

Particles in an aqueous slurry are naturally or centrifugally sedimented in a deep vessel, and the sedimentation time of the target particles is calculated according to the sedimentation speed formula of Stokes to determine the time for separating the supernatant or precipitate. By repeating the above operation, the average particle size and particle size distribution are brought close to the target values. An organic liquid can be used instead of the aqueous medium.

(2) Air Elutriation Method

According to most typical procedures, air is caused to flow upward at the same speed as the natural falling speed of particles having a specific particle size, whereby larger particles are separated in the lower portion and smaller particles are separated in the upper portion. A liquid such as water can be used instead of air.

(3) Cyclone Method

According to the liquid or gas cyclone principle, particles having a particle size larger than the specific particle size can be recovered from the bottom and particles having a particle size smaller than the specific particle size can be recovered from the top. Therefore, by passing particles through a multi-staged cyclone, the average particle size and particle size distribution can be brought close to the target values.

(4) Sieving Method

A sample is passed through two sieved having a mesh size close to the target particle size to cut off an unnecessary fraction of the particle size distribution. This method is defective in that jamming readily occurs and the productivity is low.

An example of the method in which the powdery adhesive of the present invention is applied to fabrication of a liquid crystal electro-optical element will now be described. A sealing epoxy resin is screen-printed on the peripheral portion of the glass substrate on which an electroconductive film and an orienting film have been formed in this order to form a pattern, while leaving the liquid crystal-introducing area unprinted, and spacer particles and the powdery adhesive are scattered on a glass substrate. A similar glass substrate is positioned and piled on the above glass substrate, and under compression, the sealing epoxy resin and powdery adhesive are heat-cured. Finally, under a reduced pressure, the assembly is immersed in a liquid crystal, and the pressure is gradually elevated and the liquid crystal is introduced from an introduction hole. The introduction hole is sealed by a room temperature-curing epoxy resin.

In general, the scattering density of the powdery adhesive on the substrate is 0.0005 to 1 mg/cm$^2$.

According to the present invention, a powdery adhesive having a high bonding force and a high peel strength and comprising spherical particles can be provided.

Especially, the powdery adhesive of the present invention has a strong bonding force and an effect of maintaining a constant spacing as a spot adhesive applied between substrates of a liquid crystal electrooptical element. Accordingly, the powdery adhesive is preferably used for fabrication of ferroelectric liquid crystal or STN liquid crystal a cell in which a high precision is required for the spacing between substrates and an ordinary large cell. Furthermore, even if the cell is placed at a low temperature of $-30°$ C., vacuum bubbles are not generated, and thus a high quality as a commercial product can be maintained.

Moreover, since a high peel strength is attained, the powdery adhesive of the present invention is suitable for spot bonding in a liquid crystal cell comprising film substrates.

The present invention will now be described in detail with reference to the following examples, that by no means limit the scope of the invention.

EXAMPLE 1

A transparent ethyl acetate solution containing 30% by weight of a solid comprising two kinds of bisphenol A diglycidyl ether type epoxy resins, that is, 3.5 parts by weight of EPIKOTE 828 (supplied by Yuka-Shell Epoxy; epoxy equivalent value=187) and 3.5 parts by weight of EPIKOTE 1001 (supplied by Yuka-Shell Epoxy; epoxy equivalent value=470), 1.5 parts by weight of a phenol type latent curing agent (EPICURE 171N supplied by Yuka-Shell Epoxy; phenolic OH concentration=235 g/equivalent) and 3.0 parts by weight of a carboxyl group-modified butyl acrylate/ethyl acrylate/acrylonitrile copolymer rubber (WS023 supplied by Teikoku Kagaku Sangyo) was prepared. (When the solvent was removed from this solution, the rubber component was phase-separated from the epoxy resin component, and the residual mixture became opaque.)

Then, 10 g of the above-mentioned solution was charged in a polyethylene cup having a capacity of 100 cc, and stirring rod having TEFLON plate vanes was inserted in the solution.

An aqueous solution containing 4% by weight of polyvinyl alcohol (GOSENOL EG05 supplied Nippon Gosei Kagaku) was added to the above solution with stirring at 800 rpm 4 times at intervals of 1.5 minutes by 2 cc at each time (8 cc as a whole) and at intervals of 0.5 minute 3 times by 4 cc at each time (12 cc as a whole).

At the first addition of the aqueous solution, a W/O emulsion was formed, and at the third addition of the aqueous solution, the phase was completely inverted to form an O/W emulsion. The emulsification state was very good.

Then, 10 g of water was added, the polyethylene cup was set in a heating glass jacket, and ethyl acetate was evaporated and removed from the outside over a period of about 90 minutes while heating the surrounding atmosphere to 76° to 80° C. During the evaporation, stirring was carried out at about 50 rpm and the point at which the smell of ethyl acetate disappeared was designated as the point of termination of the removal of the solvent.

Then, the residual mixture was cooled to room temperature, a curing liquid formed by dissolving 0.7 g of piperazine in 8 g of water was added, and the mixture was allowed to stand at room temperature for 5 days under gentle stirring at about 1 rpm, whereby a slurry containing spherical particles which were not sticky at room temperature was obtained. The average particle size measured by the centrifugal sedimentation method was 13 μm, and by observation using a differential interference microscope, it was confirmed that all of the particles had a substantially uniformly fine islands-in-sea structure.

The bonding force of the so-obtained particles was determined. More specifically, 10 mg of the obtained dry powder was uniformly scattered on an area of 26 mm×20 mm in a slide glass (26 mm×75 mm) and the powder-scattered area was covered by another slide glass, the slide glasses were secured by a clip, and the curing treatment was carried out at 180° C. for 2 hours. When both ends of the bonded slide glasses were held by hand and peeling was attempted, peeling did not occur in the bonded portion but the slide glasses were broken. Thus, it was confirmed that the bonding force was very high.

A slurry containing 200 g of particles having an average particle size of about 13 μm was prepared by repeating the above-mentioned particle-forming procedures. The slurry was wet-classified by the elutriation method to obtain a slurry containing classified particles having an average particle size of 12 μm and a particle size variation of 18%. Then, a silica sol (SNOWTEX N supplied by Nissan Kagaku Kogyo) was added to the slurry in an amount of 0.5% by weight based on the solid of the slurry to cause the silica sol to be adsorbed in the particles. The particles were then recovered by filtration and dried in a vacuum.

A square glass piece having a side of 15 mm was cut from a slide glass, 0.5 mg of the classified particles were uniformly scattered on the glass piece, the particle-scattered surface was covered by a glass piece having the same size, and the assembly was secured by a clip. The assembly was placed in a hot air drier maintained at 180° C. and the curing treatment was carried out for 2 hours. The cleavage strength of the obtained test piece was 70 kg/15 mm (as determined by the method of JIS K-6853 at a pulling speed of 0.5 mm/min). The glass transition temperature (Tg) after the curing treatment was 105° C.

Separately, 0.2 mg of classified particles (0.008 mg/cm$^2$) and 0.2 mg of spacer particles composed of crosslinked polystyrene and having an average particle size of 8.0 μm (supplied by Sekisui Fine Chemical) were uniformly scattered on a square glass sheet having a side of 50 mm and a thickness of 1.1 mm, and having ITO and polyimide orienting films formed thereon. A sealing material composed of a curing agent-incorporated epoxy resin was printed on the peripheral portion of another-glass sheet of the same size. The glass sheets were piled closely together and the curing treatment was carried out at 180° C. under compression for 2 hours. The pressure was reduced to 0.05 Torr, an open end (injection opening) of the sealed portion was immersed in a TN liquid crystal (ZL1-1565 supplied by Merk Japan), and the pressure was gradually elevated to the atmospheric pressure to inject the liquid crystal into the cell. Subsequently, the injection opening was sealed by a room temperature-curing type epoxy resin.

The cell was tightly bonded by the classified particles, and although the cell was allowed to stand in an environment maintained at −30° C., a formation of vacuum bubbles did not occur.

Where classified particles free of the rubber component, which were prepared in the same manner as described above except that the copolymer rubber WS023 was not used, were used, vacuum bubbles formed at −30° C.

EXAMPLE 2

Spherical particles were prepared in the same manner as described in Example 1 except that 2.7 parts by weight of EPIKOTE 828, 2.7 parts by weight of EPIKOTE 1001, 1.0 part by weight of EPICURE 171N, and 4.6 parts by weight of WS023 were used, and classified particles having an average particle size of 11 μm and a particle size variation of 16% were prepared. The cleavage strength after the treatment at 180° C. for 2 hours was 45 kg/15 mm and the Tg was 99° C. A cell was prepared in the same manner as described in Example 1 except that the amount scattered of the classified particles was changed to 0.7 mg (0.028 mg/cm$^2$). In this cell, vacuum bubbles were not formed at −30° C.

EXAMPLE 3

A transparent liquid was prepared by stirring at 95° C., 27 g of EPIKOTE 828, 2.7 g of EPIKOTE 1001, 1.5 g of EPICURE 171N and 4.6 g of epoxy group-modified polybutadiene (E-700-6.5 supplied by Nisseki Kagaku; epoxy equivalent value=about 310). The liquid was transparent at 50° C., but at a temperature close to room temperature, phase separation occurred and the liquid became opaque.

Emulsification was carried out in the same manner as described in Example 1 while heating the liquid at 60° C. by a heating jacket. Note, in the present example, an aqueous solution containing 4% by weight of Gosenol EG05 was added 4 times at intervals of 40 seconds, by 1.5 cc each time (6 cc as a whole). The emulsified liquid was cooled to room temperature, a curing liquid formed by dissolving 0.7 g of piperazine in 8 g of water was added, and partial curing was carried out in the same manner as described in Example 1 to obtain a slurry containing spherical particles having an average particle size of 10 μm. All of the particles had a substantially uniformly fine islands-in-sea structure.

Particles having an average particle size of 12 μm and a particle size variation of 15% were obtained by the wet classification. The cleavage strength after the treatment at 180° C. for 2 hours was 40 kg/15 mm and the Tg was 95° C. When the test was carried out in the same manner as described in Example 2, vacuum bubbles were not formed at −30° C.

EXAMPLE 4

A transparent compatible liquid was obtained by dissolving 1 g of EPIKOTE 828, 9 g of an NBR-MODIFIED epoxy resin (R1415-1 supplied by ACR; NBR content=35% by weight) and 1 g of EPICURE 171N at 95° C., emulsification was carried out in the same manner as described in Example 3 while heating at 80° C. and partial curing was carried out in the same manner as described in Example 3, whereby a slurry containing spherical particles having an average particle size of 15 μm was obtained. All of the particles had a substantially uniformly fine islands-in-sea structure.

Classified particles having an average particle size of 13 μm and a particle size variation of 15% were obtained by the wet classification. The cleavage strength after the treatment at 180° C. for 2 hours was 70 kg/15 mm and the Tg was 78° C. When the test was carried out in the same manner as described in Example 2, vacuum bubbles were not formed at −30° C.

EXAMPLE 5

A transparent liquid was prepared by dissolving 5.4 g of EPIKOTE 828, 1 g of EPICURE 171N and 4.6 g of epoxy group-modified polybutadiene (E-1800-6.5 supplied by Nisseki Kagaku; epoxy equivalent value=about 310) at 95° C., and although the liquid was cooled to room temperature, phase separation did not occur.

Emulsification and partial curing were carried out in the same manner as described in Example 3 except that an aqueous solution containing 2% by weight of Gosenol EG05 was added at intervals of 1 minute 4 times by 2.5 cc at each time (10 cc as a whole) and 0.5 g of hydrous hydrazine was used instead of piperazine, and the curing time was 10 days. All of the particles had a substantially uniformly fine islands-in-sea structure, were spherical, and the average particle size was 28 μm. Classified particles having an average particle size of 30 μm and a particle size variation of 12% were obtained by the wet classification.

The cleavage strength after the treatment at 180° C. for 2 hours was 42 kg/15 mm and the Tg was 92° C. A cell was assembled in the same manner as described in Example 1 except that a small piece of a polyester film having a thickness of 24 μm was used as the spacer, the scattering amount was 0.5 mg (0.02 mg/cm²), and curing was conducted at 130° C. for 2 hours. Vacuum bubbles were not formed at −30° C.

EXAMPLE 6

A transparent chloroform solution containing 50% by weight of a solid comprising 5.4 parts by weight of EPIKOTE 828, 0.5 part by weight of EPICURE 171N and 4.6 parts by weight of epoxy-modified liquid polybutadiene (Poly bd R-45EPT supplied by Idemitsu Sekiyu Kagaku; epoxy equivalent value=about 1450) was prepared. When the solvent was removed from the solution, phase separation occurred and the residual mixture was opaque.

Emulsification and removal of the solvent were carried out in the same manner as described in Example 1 except that the solvent-removing heating temperature was changed to 60° C. The resulting mixture was cooled to room temperature, 0.5 g of hydrous hydrazine was added, and partial curing was carried out at room temperature under gentle agitation for 10 days. The formed particles had an average particle size of 10 μm, a substantially uniform fine islands-in-sea structure, and the particles had a spherical shape. Classified particles having an average particle size of 10 μm and a particle size variation of 17% were obtained by the wet classification. The cleavage strength after the treatment at 180° C. for 2 hours was 50 kg/15 mm and the Tg was 98° C.

When the test was carried out in the same manner as described in Example 1, vacuum bubbles were not formed at −30° C.

EXAMPLES 7 THROUGH 10

A transparent chloroform solution containing 50% by weight of a solid comprising an epoxy resin EPIKOTE 828, another epoxy resin, EPIKOTE 1001, and an epoxy-modified polybutadiene type liquid rubber, E-700-6.5, were charged in amounts shown in Table 1 into a polyethylene cup having a capacity of 100 cc. Spherical particles which were non-sticky at room temperature were obtained in the same manner as described in Example 6. The respective particles had a fine islands-in-sea structure.

The T-peel strength was measured with respect to the dried powder in the following manner. In a test piece of a polyester-sulfone film having a thickness of 100 μm and a size of 10 mm×30 mm, on one surface of which an ITO film was formed, the above-mentioned particles were scattered at a density of 0.22 mg/cm² in an area of 10 mm×20 mm on the side of ITO film, and a similar test piece was piled on the above test piece so that the side of the ITO film was in contact with the particles. The test pieces were placed between slide glasses secured by clips, the curing treatment was carried out at 130° C. for 2 hours, and the T-peel strength of the so-obtained sample was measured. The open ends of the test pieces were pulled in the horizontal direction by hand, and the T-peel strength was measured. The sample having a higher T-peel strength than that of the comparative sample free of E-700-6.5 is marked "o", the sample having a T-peel strength substantially equal to that of the comparative sample is marked "Δ", the sample having a T-peel strength lower than that of the comparative sample is marked "x", and the sample having a much higher T-peel strength than that of the comparative sample is marked "⊙".

The mixing ratios, particles sizes, and performances are shown in Table 1.

TABLE 1

| Example No. | Mixing Ratio of Solid (g) | | | Particle Size (μm) | | | T-Peel Strength |
|---|---|---|---|---|---|---|---|
| | Epikote 828 | Epikote 1001 | E-700 −6.5 | Average | Minimum | Maximum | |
| 7 | 2.25 | 2.25 | 0.5 | 15 | 0.5 | 70 | ○ |
| 8 | 1.75 | 1.75 | 1.5 | 20 | 0.5 | 70 | ⊙ |
| 9 | 1.25 | 1.25 | 2.5 | 33 | 0.5 | 180 | ○ |
| 10 | 0.875 | 0.875 | 3.25 | 26 | 0.5 | 150 | ○-Δ |

EXAMPLE 11

A transparent solution containing 50% by weight of a solid was prepared by dissolving 1.5 parts by weight of Epikote 1001, 8.5 parts by weight of NBR-modified epoxy resin (R1415-1) and 1 part by weight of Epicure 171N in chloroform. The solution was emulsified in the same manner as described in Example 1, 10 parts by weight of water was added, the resulting emulsion was heated to 60° C. in the same manner as described in Example 1, and chloroform was caused to volatilize, to obtain a slurry containing spherical particles having an average particle size of 12 μm. The particles separated by filtration were not sticky at room temperature and all had a substantially uniformly fine islands-in-sea structure.

Classified particles having an average particle size of 12 μm and a particle size variation of 17% were obtained by the wet classification. As measured in the same manner as described in Example 1, the cleavage strength after the treatment at 180° C. for 2 hours was 68 kg/15 mm and the Tg was 70° C. When the test was carried out in the same manner as described in Example 4, vacuum bubbles were not formed.

We claim:

1. A powdery adhesive comprised of spherical particles comprising 40 to 90 parts by weight of an epoxy resin component and 10 to 60 parts by weight of a rubber component, said spherical particles containing up to about 15 parts by weight of a latent curing agent for the epoxy resin component per 100 parts of the total weight of the epoxy resin component and the rubber component, wherein the average particle size of the particles is from 0.1 to 500 μm.

2. A powdery adhesive as claimed in claim 1, wherein the epoxy resin component comprises 50 to 80% by weight and the rubber component comprises 20 to 50% by weight.

3. A powdery adhesive as claimed in claim 1, wherein the epoxy resin has at least 2 epoxy groups in the molecule.

4. A powdery adhesive as claimed in claim 1, wherein the rubber component is soluble in an organic solvent.

5. A powdery adhesive as claimed in claim 1, wherein the rubber component has a epoxy or glycidyl group.

6. A powdery adhesive as claimed in claim 1, wherein the latent curing agent is selected from bisphenols and condensates thereof.

7. A powdery adhesive as claimed in claim 1, wherein the amount of the latent curing agent is 0.05 to 1 equivalent per equivalent of the epoxy groups of the epoxy resin.

8. A powdery adhesive as claimed in claim 1, wherein the epoxy resin component and the rubber component are present in a phase-separated structure.

9. A powdery adhesive as claimed in claim 1, wherein the epoxy resin is partially cured.

10. A powdery adhesive as claimed in claim 1, wherein the particle size is 0.5 to 200 μm and the variation of the particle size is within 30%.

11. A process for the preparation of a powdery adhesive, which comprises a step of preparing a compatible mixture comprising an epoxy resin component, a rubber component and a common organic solvent for said epoxy resin and rubber components, wherein said epoxy resin component 40 to 90 parts by weight and said rubber components comprises 10 to 60 parts by weight, said mixture contains up to about 15 parts by weight of a latent curing agent for the epoxy resin component per 100 parts of the total weight of the epoxy resin component and the rubber component; a step of emulsifying or suspending the compatible mixture in an aqueous medium, whereby spherical particles composed of said mixture being formed; a step of removing the organic solvent from the mixture, whereby causing a phase separation of the epoxy resin component and the rubber component in the spherical particles; and a step of collecting said spherical particles.

12. A process according to claim 11, wherein the organic solvent has a boiling point lower than 100° C. and is water-insoluble.

13. A process according to claim 12, wherein the organic solvent is selected from chloroform, methylene chloride, carbon tetrachloride, ethyl ether, ethyl acetate and benzene.

14. A process according to claim 11, wherein the compatible mixture is emulsified or suspended by using a surface active agent.

15. A process according to claim 14, wherein the aqueous medium is gradually added to the compatible mixture while strongly stirred, or the compatible mixture is gradually added to the aqueous medium while strongly stirred.

16. A process according to claim 15, wherein a water-in-oil type emulsion is first formed and then converted to an oil-in-water type emulsion.

17. A process for the preparation of a powdery adhesive, which comprises a step of preparing a compatible mixture comprising an epoxy resin component, a rubber component and a common organic solvent for said epoxy resin and rubber components, wherein said epoxy resin component comprises 40 to 90 parts by weight and said rubber component comprises 10 to 60 parts by weight, a step of emulsifying or suspending the compatible mixture in an aqueous medium, whereby spherical particles composed of said mixture being formed, a step of removing the organic solvent from the mixture, whereby causing a phase separation of the epoxy resin component and the rubber component in the spherical particles, a step of adding an amine type curing agent to the emulsion or suspension, whereby partially curing the epoxy resin component in the spherical particles so that at least surface of the spherical particles loses stickiness, and a step of collecting said spherical particles.

18. A process according to claim 17, wherein the compatible mixture contains a latent curing agent for the epoxy resin component.

19. A process according to claim 17, wherein the organic solvent has a boiling point lower than 100° C. and is water-insoluble.

20. A process according to claim 19, wherein the organic solvent is selected from chloroform, methylene chloride, carbon tetrachloride, ethyl ether, ethyl acetate and benzene.

21. A process according to claim 17, wherein the compatible mixture is emulsified or suspended by using a surface active agent.

22. A process according to claim 21, wherein the aqueous medium is gradually added to the compatible mixture while strongly stirred, or the compatible mixture is gradually added to the aqueous medium while strongly stirred.

23. A process according to claim 22, wherein a water-in-oil type emulsion is first formed and then converted to an oil-in-water type emulsion.

* * * * *